United States Patent [19]

Muddle

[11] 4,427,083
[45] Jan. 24, 1984

[54] LIVESTOCK WEIGHING APPARATUS

[75] Inventor: John R. Muddle, Lewis, England

[73] Assignee: Poldenvale Ltd., Taunton, England

[21] Appl. No.: 276,376

[22] PCT Filed: Oct. 22, 1980

[86] PCT No.: PCT/GB80/00177
§ 371 Date: Jun. 15, 1981
§ 102(e) Date: Jun. 15, 1981

[87] PCT Pub. No.: WO81/01196
PCT Pub. Date: Apr. 30, 1981

[30] Foreign Application Priority Data
Oct. 23, 1979 [GB] United Kingdom ................ 7936800

[51] Int. Cl.³ ........................................... G01G 17/08
[52] U.S. Cl. ................................................. 177/132
[58] Field of Search .............. 177/132, 133, 145, 211, 177/245, DIG. 3, DIG. 8

[56] References Cited

U.S. PATENT DOCUMENTS

| | | | |
|---|---|---|---|
| 2,899,191 | 8/1959 | Hunt | 177/211 |
| 3,063,635 | 11/1962 | Gordon | 177/DIG. 8 |
| 4,170,268 | 10/1979 | Nordstra | 177/211 X |
| 4,258,814 | 3/1981 | Dillon | 177/211 X |
| 4,286,679 | 9/1981 | Schneider | 177/132 |

Primary Examiner—Joseph W. Hartary
Attorney, Agent, or Firm—Michael J. Striker

[57] ABSTRACT

The apparatus comprises a platform (4) on which an animal to be weighed can be led and means (1) to restrain the animal on the platform. Load beams (5a, 5b) each containing electrical strain gauges are located below the platform and support it from the ground. An electronic circuit in a unit (7) sums the output from the strain gauges and provides a direct reading of the weight of an animal in kilograms.

6 Claims, 4 Drawing Figures

LIVESTOCK WEIGHING APPARATUS

TECHNICAL FIELD

This invention relates to improved apparatus for weighing livestock. Accurate and periodic weighing of livestock is important in good livestock control and a range of animal weighing apparatus for such use is available.

BACKGROUND ART

Conventionally such apparatus comprises a frame pendantly supporting a cattle crush or a sheep, pig or calf crate. The difference between the loads exerted on the frame when the livestock is, or is not, located in the crush or crate being measured to give the weight of the animal. It has been proposed to measure this load electrically using an electrical load cell.

A major disadvantage of such known equipment is the need to have the animal hanging from a supporting frame. The frame increases the cost and weight of the apparatus making it more difficult to move the apparatus from one location to another and the pendant support of the crush or crate means that movements of the animal within the crush or crate perturb the accurate assessment of the weight, making such assessment difficult and time-consuming.

A further disadvantage of the known equipment is the need to level it prior to a weighing operation to ensure that the pendantly-supported crush or crate does not bear against the supporting frame.

DISCLOSURE OF INVENTION

This invention relates to an improved livestock weighing apparatus which supports the crush or crate from below by means incorporating a plurality of electrical loadsensing means, the electrical output from the load-sensing means being summed and displayed directly on a read-out device.

According to one aspect of the invention, livestock weighing apparatus comprising an animal supporting platform, means to restrain an animal standing on the platform from leaving the same and weight-sensing means to determine the weight of an animal standing on the platform, is characterised in that the platform is entirely supported from below by means including a plurality of electrical load-sensing means, the electrical outputs from the load-sensing means being summed in an electronic circuit, the output of which is fed to a read-out device.

Conveniently the electronic circuit can be operated from the mains supply (e.g. at 240 or 120 volts A.C.) or from rechargeable batteries and the read-out device provides a digital display. Suitably the load-sensing means are strain gauges combined in groups in a load beam and two such load beams are used to support a rectangular platform one adjacent the opposite ends thereof, which platform either forms the base of the animal-restraining means or defines a platform on which the animal-restraining means (e.g. a conventional crush or crate) can be placed.

A particular advantage of a livestock weighing apparatus in accordance with the invention is that a completely rigid construction results having no suspension system, no mechanical levers and no bearings or knife edges, thus providing a system for averaging the weight of the animal in the animal-restraining means within a few seconds of the animal being placed therein and in that way eliminating many of the fluctuations seen when a conventional livestock weighing apparatus is used. The load beams can be bolted or welded to the underside of a cattle crush or weighcrate or can form an integral part of the base of such a crate or crush. Such beams can be provided with adjustable feet to permit the beams to stand rigidly on non-level ground. Suitably the electronic equipment is housed in a weather-proof enclosure which can be free-standing or secured to the crush or crate.

Wheels of adjustable height may be provided in place of, or in addition to, the adjustable feet on one or both beams, to permit the apparatus to be moved easily by one man.

BRIEF DESCRIPTION OF DRAWINGS

One embodiment of fully electronic digital livestock weighing apparatus in accordance with the invention will now be described, by way of example, with reference to the accompanying drawings, in which.

DESCRIPTION OF PREFERRED EMBODIMENT

Figure 1:
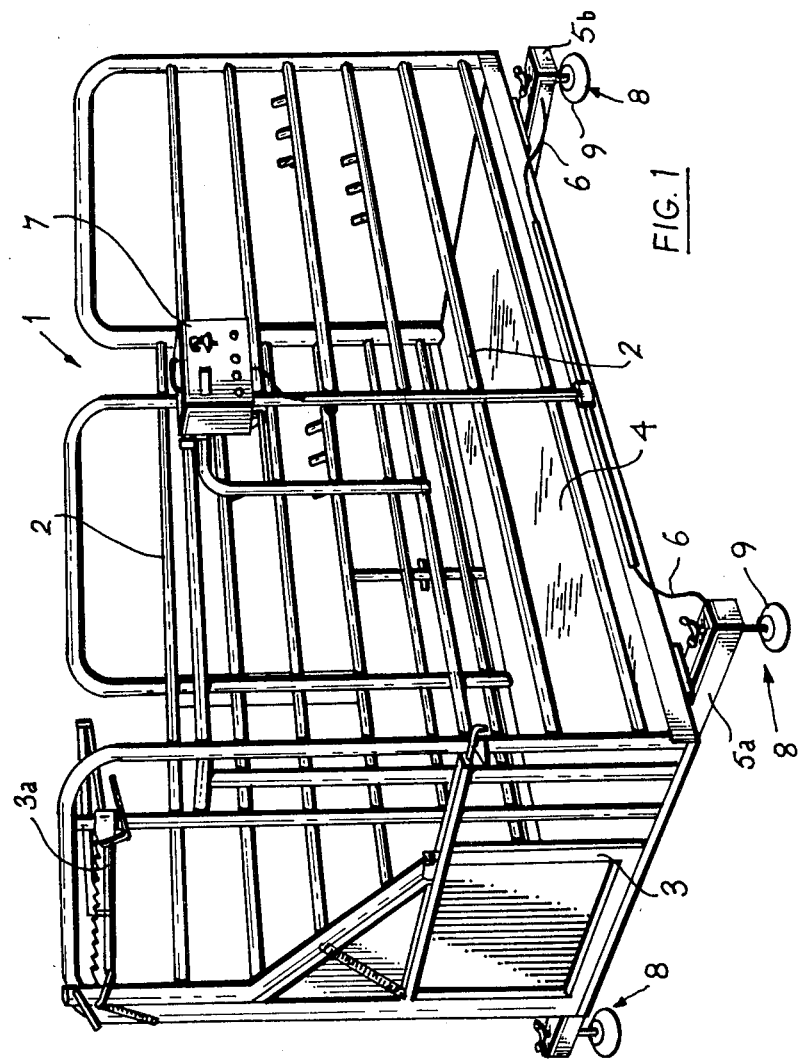
FIG. 1 is a perspective view of the complete apparatus.

Referring to FIG. 1, the apparatus comprises a cattle crush 1 having tubular side walls 2 and an end gate 3. The end gate incorporates conventional means 3a for retaining the animal within the side walls 2 so that it is standing on a platform 4 of the crush 1. Since any convenient retaining means for the animal can be used, it is not deemed necessary to describe this part of the apparatus in further detail.

The platform 4 rests on (and is normally attached to) a pair of load beams 5a and 5b each of which incorporates four double resistive strain gauges. The strain gauges from the two load beams are connected together in an electrical bridge connection and via connecting leads 6 feed an electrical output to an electronic circuit incorporating a read-out device in a housing 7. In the embodiment shown in FIG. 1, the housing 7 is mounted on one side wall 2 of the cattle crush 1 but a free-standing unit is also contemplated. Each load beam is provided with at least one adjustable foot 8 which desirably includes a screw-threaded member connected via a ball and socket type connection to a ground-engaging plate 9. Two adjustable feet 8 are shown on the load beam 5a in FIG. 1, but since the height adjustment on a beam is only needed to ensure that beam is resting rigidly on the ground (or other supporting surface), one adjustable foot per beam would suffice. It is not necessary to level the platform 4 with the feet 8.

Figure 2:
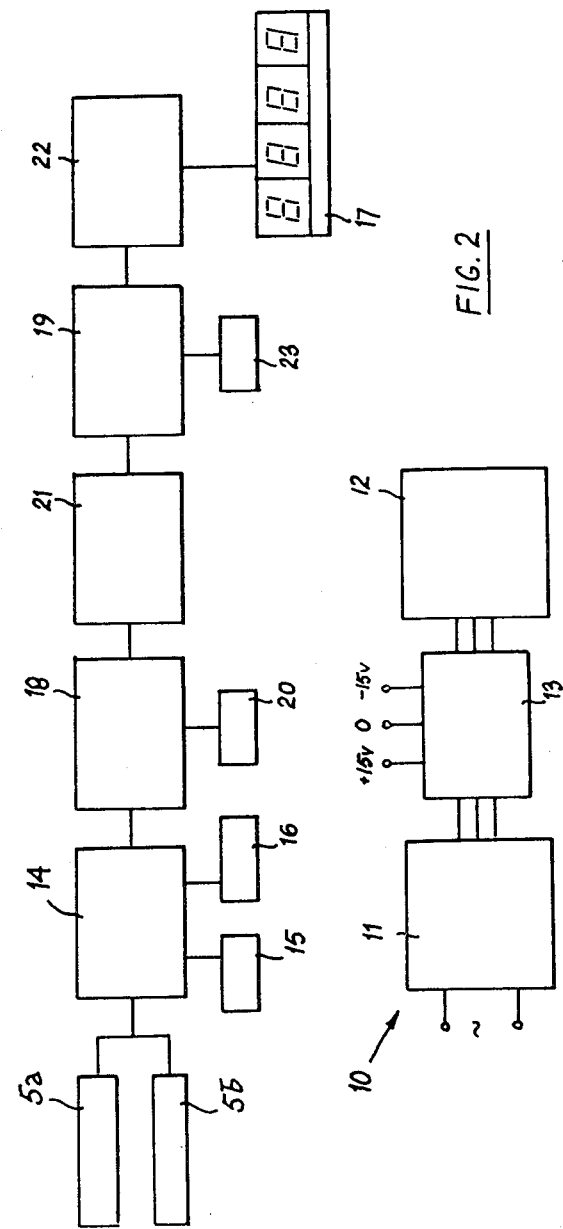
FIG. 2 is a schematic circuit diagram of the load beams and their connection to an electronic read-out device.
Figure 3:
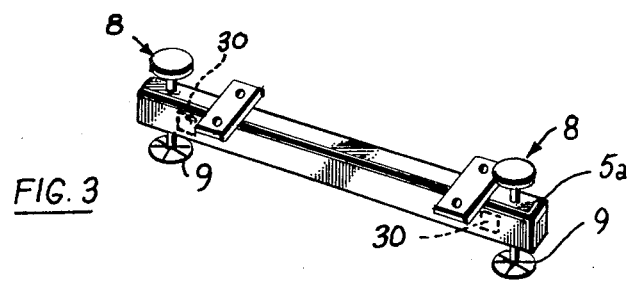
FIG. 3 is a schematic view of one of the load beams removed from the underside of a cattle crush such as that shown in FIG. 1.

The electronic circuit incorporated in the housing 7 is illustrated diagrammatically in FIG. 2. The power supply for the circuit is shown at 10 in the lower part of FIG. 2 and comprises a stabilised power supply and battery charger 11 provided with an A.C. input, a rechargeable battery pack 12 (of ±15 volts D.C. output) and a high/low voltage detector 13 to control the charging rate of the pack 12. The output from the load beams 5a and 5b is fed, via the lines 6, to an instrumentation amplifier 14.

Figure 4:
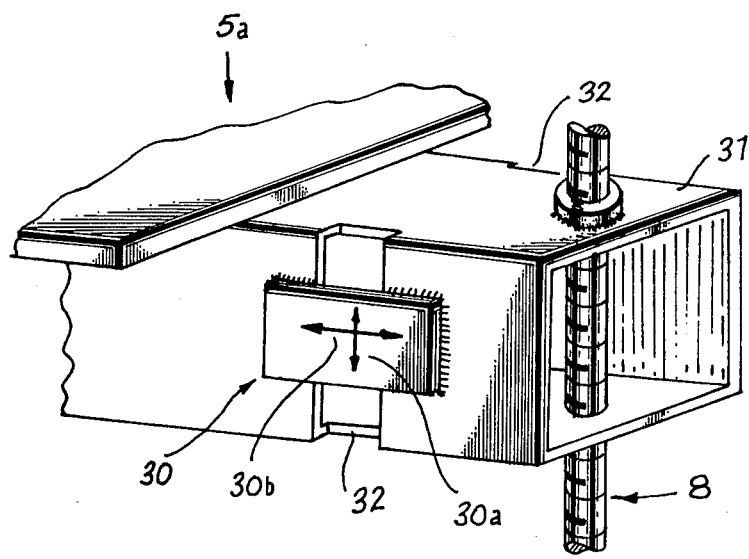
FIG. 4 is an enlarged schematic view of one end of the load beam of FIG. 3 with the protective weather-proof cover removed.

There are four pairs of resistive strain gauges 30 in each beam 5a and 5b and the disposition of one of these can be seen from FIG. 4. The pairs of gauges 30 are located one pair adjacent each end on each of the two vertically disposed opposite sides of a rectangular section steel beam 31. Each pair is positioned across a weakened region 32 of the beam 31. Each pair of gauges 30 includes one 30a to sense vertical strain and one 30b to sense horizontal strain and the eight gauges on each beam are connected together in pairs in a bridge connection, the energising voltage being applied across one pair of diagonally opposite corners of the bridge, and the output being taken across the other diagonally opposite corners. The outputs from the two bridges are applied in parallel to the input of the amplifier 14.

The amplifier 14 is selected to have good drift resistance, linearity and noise rejection capability and is used to amplify the small voltage signals leaving the load beams. It preferably includes precision feedback networks to ensure a committed internal gain.

The amplifier 14 is provided with two controls 15 and 16. The control 15 combines a "coarse control" (giving a possible offset of up to 35 percent of the full load which the apparatus can weigh, to facilitate the fitting of auxiliary equipment to the crush 1 without affecting the total weight range of the apparatus) and a "fine control" (principally intended to zero out the effects of dung falling on the crush, or water absorbed by the platform 4, and has a range of plus or minus 6 least significant digits of a four digit read-out display 17). A plus or minus sign is shown on the display 17, the plus sign indicating that the system is in a correct state and the minus sign indicating that the system has been over-zeroed. The display automatically goes blank in the event of the platform being overloaded.

The control 16 controls the gain of the amplifier 14 and thus adjusts the span of the weighing device (i.e. the total range of weights over which the device will operate).

The output from the amplifier 14 is fed to an active filter 18 which eliminates noise from the output of the amplifier. This filter can be incorporated in the inlet stage of the amplifier 14 if desired.

The output from the active filter 18 is fed to an analogue-to-digital converter 21 and, in the circuit shown in FIG. 2, to a digital averager 19. The time over which the average of the output from the converter 21 is assessed is set by a control 20 and would typically be three seconds (this period being found to be long enough to smooth out load variations caused by movement of the animal on the platform 4).

In an alternative arrangement, the averager 19 can be dispensed with by averaging the analogue output from the filter 18 (again over some three seconds) by simply extending the integrate time on the converter 21.

From the digital averager 19 (or directly from the A/D converter 21 where no digital averager 19 is employed) the signal is fed to a decoder driver 22 and then to the digital display 17. Where the display 17 incorporates a decoder driver, the unit 22 can be dispensed with.

The load beams 5a and 5b permit the apparatus to weigh in one kilogram increments from zero to 1999 kilograms. A lower weight range can be used if the apparatus is only to be used for weighing sheep, pigs, and calves.

Binary coded digital outputs 23 are provided which can interface with ancillary equipment for example a printer, an extra large digital display or an automatic drafting system.

Although the embodiment shown in FIG. 1 has the load beams 5a and 5b directly mounted below the cattle crush 1, it will be appreciated that the load cells can be attached to the underside of a supporting platform on which any conventional crush or animal crate could be rested.

The circuit used to operate the apparatus can include a microprocessor, in which case the outputs from the A/D converter will be fed to the input port of the microprocessor.

The weight will then be averaged digitally in the microprocessor and the complete logic programme controlled by a dedicated programme in the read-only-memory of the microprocessor.

An apparatus in accordance with the invention can be used for a continuous walk-through weighing system. It may be desirable to extend the platform 4 in this case so that each animal is wholly on the platform long enough to get a reliable average of its weight. Since the weighing apparatus is of rigid construction with no pendantly supported platform such an arrangement is possible and accurate weight assessment can be made with considerably less than a three second averaging period.

I claim:

1. Livestock weighing apparatus comprising an animal supporting platform supported from below by means including a plurality of electrical load-sensing means, the electrical outputs from the load-sensing means being summed in an electronic circuit the output of which is fed to a read-out device, characterised in that the platform defines the base of an animal crush or crate, the load-sensing means being located in groups in a load beam (5a, 5b) of rigid construction, two such load beams being secured to the underside of the platform (4), one adjacent to each of two opposite ends thereof, and each load beam being provided with an adjustable foot (8) adjacent each end thereof for rigidly supporting each load beam and thus the crush or crate on a supporting surface for the apparatus.

2. Weighing apparatus as claimed in claim 1 characterised in that the electronic circuit (7) includes a rechargeable battery pack (12) and a mains charger (11) therefor.

3. Weighing apparatus as claimed in claim 1, characterised in that the read-out device (17) provides a digital display giving the animal's weight in kilograms.

4. Weighing apparatus as claimed in claim 1, characterised in that the electronic circuit (7) includes means (19) to average the weight sensed over a pre-set period and display the averaged weight on the read-out device (17).

5. Weighing apparatus as claimed in claim 1, characterised in that the electronic circuit (7) includes means (15) to offset the weight of the crush or crate so that the read-out device registers zero when there is no animal on the platform.

6. Weighing apparatus as claimed in claim 1, characterised in that each load beam has strain gauges (30) bridging weakened regions (32) of vertically disposed opposite sides of a rectangular section steel beam (31) at a location between a foot (8) and the attachment to the platform (4).

* * * * *